Dec. 15, 1959     F. R. CHEEK     2,916,881
CONTROLLED FLUID COUPLING
Filed Dec. 27, 1954
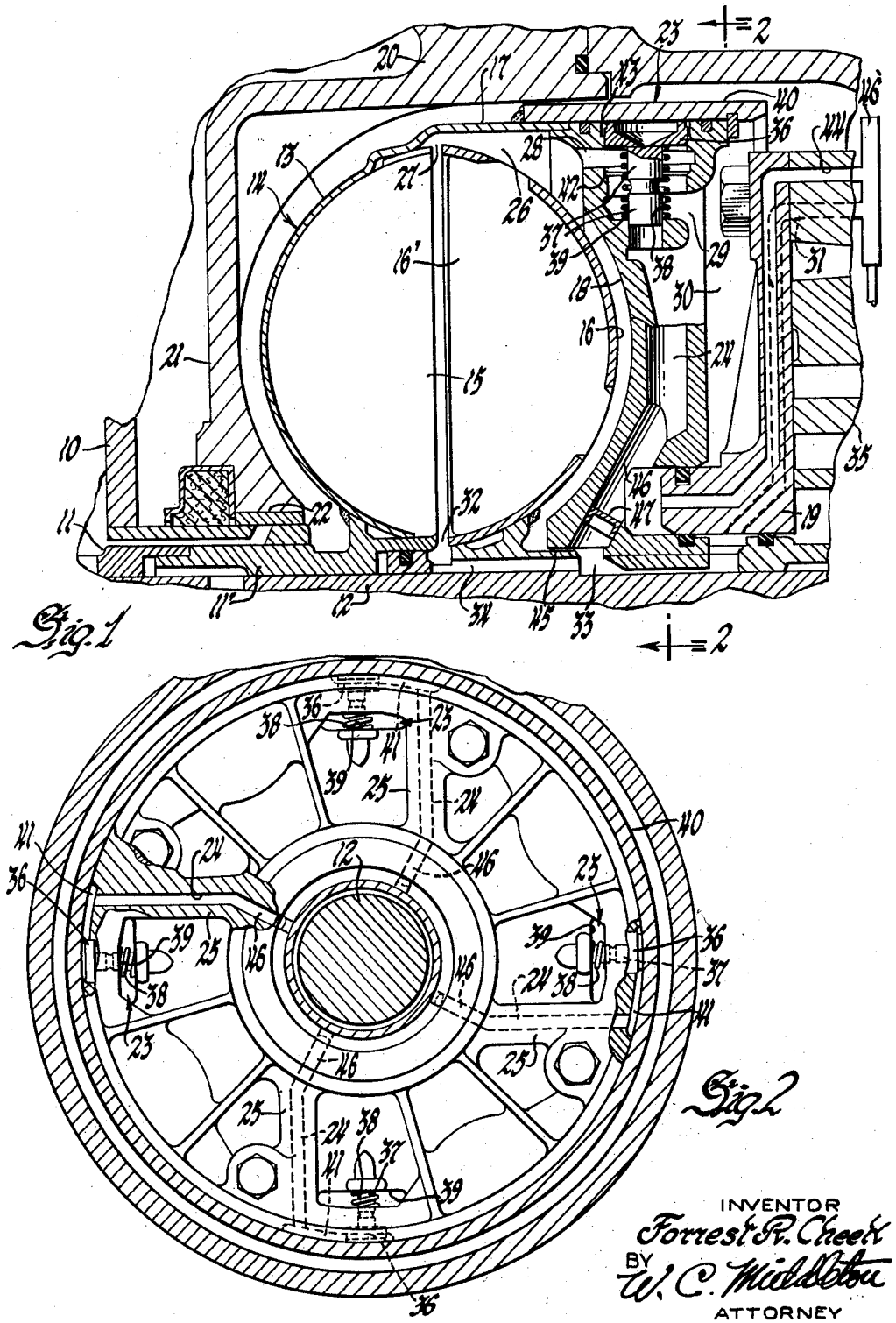
INVENTOR
Forrest R. Cheek
BY
W. C. Middleton
ATTORNEY

United States Patent Office 2,916,881
Patented Dec. 15, 1959

2,916,881
CONTROLLED FLUID COUPLING

Forrest R. Cheek, Detroit, Mich., assignor to General Motors Corporation, Detroit, Mich., a corporation of Delaware Application December 27, 1954, Serial No. 477,682

8 Claims. (Cl. 60—54)

This invention relates to a fluid coupling for use in a transmission and having a valve to control the filling and emptying of said coupling.

In a type of automatic transmission used in motor vehicles at the present time, fluid pressure operated bands and friction disk or cone clutches are employed for controlling the speed ratios drives by their engagement or disengagement. It is desirable at times to replace the friction clutch with a fluid coupling that can be emptied or filled to vary the speed ratio drive, since the use of a fluid coupling will generally provide a smoother shift to a different gear or speed ratio. When a fluid coupling is used instead of a friction device, some means must be provided for quickly emptying and filling the coupling so that it will have the same effect as the friction device.

Therefore, it is an object of this invention to provide a fluid coupling with a fluid pressure actuated valve for determining when a fluid coupling will be filled or emptied of fluid.

Other features, advantages and objects will become apparent by reference to the detailed description of the invention and to the drawings wherein;

Fig. 1 is a cross-sectional view of one-half of a fluid coupling showing an embodiment of the present invention; and Fig. 2 is a sectional view on a reduced scale of the entire end structure with one-half thereof viewed in the direction of the arrows 2—2 of Fig. 1, showing the path of the fluid.

Referring to the drawings and more particularly to Fig. 1, 10 indicates a driving member, which may be driven by any suitable means such as the output shaft of an engine, having attached thereto a sleeve 11 rotatably mounted on a driven or output shaft 12. Sleeve 11 is connected to drive hub 11' of the pump of a fluid coupling 14. Connected to said hub for rotation therewith is a casing or shroud member 13. Secured to said casing are a plurality of impeller or pump blades 15 having a semi-elliptical shape in cross-section and facing a turbine 16 having similarly shaped turbine blades 16'. The hub of turbine 16 is secured to the driven shaft 12. Fluid circulated by the impeller will cause the turbine member to be brought gradually from a state of rest to a speed approximate to the speed of the turbine, this function being well known in the art of fluid couplings.

The casing or shroud 13 has an extension 17 terminating in an enlarged wheel-like portion 18 rotatably mounted on an extension 19 of the stationary casing 20 surrounding and enclosing the fluid coupling. The front portion 21 of this casing 20 closely surrounds the input member 10 at 22. The enlarged rotatable portion 18 contains a plurality of valves 23 and bores 24 drilled within the straight spokes or bosses 25 as shown in Fig. 2, for controlling the exhaust of fluid from the fluid coupling. As illustrated in Fig. 2, four valves are shown in balanced relationship around the wheel portion 18; however, it will be obvious that any number of valves could be used without changing the spirit of the invention.

The space between the driven rotor 16 and portion 18 of the shroud provides a chamber 26 for containing fluid discharged from the coupling at 27. Valves 23 control the exhaust of fluid from this discharge chamber to the oil reservoir (not shown) through passages 28 and 29, the passage 29 opening into a common drain passage 30 connected to the reservoir. The valves 23 are mounted adjacent to the periphery of the shroud extension 17 to assure a quick emptying action. This is necessary since the centrifugal force of the fluid is great when the coupling is rotating at or above idling speed of the engine and would tend to prevent adequate discharge of the fluid if the valve and discharge opening were located in any other radial position.

The coupling is filled by means of fluid within a conduit 31 drilled within the stationary casing 20 and connected to the hub of the coupling at 32 by means of conduits 33 and 34, drilled within portions of the rotatable shroud and the driven shaft, respectively. Fluid may be supplied to conduit 31 by any suitable means, such as in this case, a fluid pump 35.

One of the valves 23 is shown in Fig. 1 in a position permitting the discharge of fluid from chamber 26 to passage 29 and consists of a spool type valve mounted for reciprocation within a bore or hollowed out portion of the shroud section 18. The valve at one end has an enlarged portion 36 adapted to be actuated by fluid pressure and a plurality of smaller lands 37 permitting communication between chamber 26 and passage 29. An annular cover plate 40 is fixed to the shroud member 17 to provide a fluid pressure seal and a stop for the upper movement of valve 23. A spring 38, seated between a shoulder 39 of the rotatable shroud, and the enlarged land 36, normally maintains the valve in the position shown. As the shroud is rotated, the centrifugal force acting on the revolving valve mass also helps to maintain the valve in this position. The centrifugal force also aids the spring in the event, for instance, the valve becomes sticky due to accumulation of dirt between the rear land and the valve body. Furthermore, on cold starts, the viscosity of any oil that may be present between the valve and valve body may cause sticking of the valve, which, if it were not for the additional centrifugal force acting on the valve, would tend to counteract the force of the spring.

A recess 41, shown in Fig. 2, in the shroud member connects the land 36 and bore 24 so that upon admission of fluid to the bore, valve 23 will be actuated to a downward position as seen in Fig. 1, seating land 36 against shoulder 42 of the shroud to block off communication of fluid between discharge chamber 26 and passage 29. The uppermost edge of land 36 is chamfered at 43, so that when the valve is in its down or closed position, leakage of oil may occur from recess 41 to chamber 26 to wash away any dirt or foreign matter that may accumulate around the valve. The lower portion of land 36 is provided with a knife-like or sharp edge so that upon engagement with shoulder 42, a tight seal will be provided to prevent leakage of fluid at this point.

Fluid is supplied to bore 24 by means of a passage 44 drilled within the stationary casing 20, and connected to the fluid pump 35. Intersecting bore 24 is a passage 46 drilled from the hub of the wheel portion 18 on a radius so as to break through the wall of the wheel to communicate with passage 44. A sealing member 47 prevents escape of fluid into passage 33. Conduits 31 and 44 are adapted to be supplied with fluid simultaneously so that the valve will close at the same time that fluid is supplied to the coupling proper. Although fluid is supplied through port 32 for filling the coupling, a slight amount of leakage occurs between the rotor hub and shroud member at 45 to also permit fluid to enter the coupling by way of the discharge port 27.

Any suitable means, represented by the block 46', may be provided for controlling the supply of fluid to conduits 31 and 44, such as for example, the controlled coupling valve shown in the co-pending application of August H. Borman et al., S.N. 477,832, filed December 27, 1954, entitled "Controlled Coupling Automatic Transmissions."

In the actual operation of the device, upon rotation of the driving shaft 10 and before fluid is supplied to conduits 31 and 44, the impeller or pump 15 will spin freely without transmitting torque to turbine member 16. Valve 23 will be in the position shown, due to the action of spring 38 and the centrifugal force acting on the valve, permitting the exhaust of any fluid present in the coupling to the reservoir (not shown) by means of passages 28 and 29. As soon as fluid is supplied to conduit 44 by pump 35 and the control means (not shown), valve 23 will be moved by the fluid pressure on its outer end to its closed position preventing the escape of fluid from chamber 26 to passage 29, thus permitting the coupling to fill with fluid supplied by conduit 31, passages 33, 34 and port 32 and in a small manner by way of the leakage at 45. In its closed position, the land 36 prevents any communication of fluid to the underside of the land, thereby assuring that the spring aided by centrifugal force acting on the revolving valve will be the only forces tending to open the valve. Due to the chamfered edges at 43, any foreign matter accumulated around the valve due to centrifuging by the coupling will be washed away. As the stages of filling the coupling progressively change from empty to full, the pump 15 will cause the fluid to be circulated to move the turbine member from a state of rest to substantially a 1 to 1 speed ratio with respect to the pump.

Upon discontinuance of the fluid supply by the control means, centrifugal force aided by spring 39 will open valve 23, the coupling will empty, and the turbine member 16 connected to driven shaft 12 will come to rest.

From the foregoing, it will be seen that the present invention provides a reliable and efficient manner of controlling the filming and emptying of a fluid coupling. It will be understood that the invention can be modified beyond the illustrated embodiment, and therefore any limitations to be imposed are those set forth in the following claims.

I claim:

1. In a fluid coupling capable of being filled and emptied of fluid, a rotatable casing having a passage therein for the discharge of fluid from said coupling, said casing being provided also with a bore therein communicating with said passage, a valve slidably mounted in said bore for controlling the flow of fluid through said passage, said valve having open and closed positions, said discharge fluid flowing through said passage in the open position of said valve, a source of fluid pressure, conduit means connecting said source and said coupling for filling the same, secondary conduit means connecting said source and the bore, the fluid in the bore acting on one end of said valve to actuate the valve to a closed position to prevent the flow of fluid through said passage, said one end of the valve being provided with chamfered edges cooperating with said bore to define an opening between said bore and said valve when said valve is in a closed position, thereby communicating the fluid in said secondary conduit means with the fluid in said passage, and means for opening said valve.

2. A fluid coupling as claimed in claim 1, wherein said valve opening means consists of a spring means biasing said valve to an open position, said valve being subjected to the action of centrifugal force upon rotation of the casing to aid the spring means to open the valve.

3. In a fluid coupling having a rotatable casing, a passage through said casing for the flow of fluid from said coupling, a bore within said casing intersecting said passage, valve means slidably mounted within said bore for controlling the flow of fluid through said passage, said valve means having a recess at one end, said valve means having open and closed positions, means for opening said valve to permit flow of fluid through said passage, and fluid pressure means acting on said valve at said recessed end to actuate said valve to a closed position, the valve in closed position positioning the recess within the passage to permit communication between the fluid actuating the valve and the passage.

4. A fluid coupling as in claim 3, wherein said valve is formed with a plurality of lands, said valve in open position having one land subjected to fluid pressure from said coupling acting in a direction to maintain said valve open when the coupling is emptying, said valve in closed position preventing fluid pressure from the coupling from exerting a force on the valve to move it to open position.

5. In a fluid coupling having a rotatable casing, a source of fluid pressure, conduit means connecting said source and said coupling for filling the same, said casing having a first passage for emptying the coupling, said casing having a second passage joining said first passage, secondary conduit means connecting said second passage and said source, a valve slidably mounted in said second passage controlling the flow of fluid through said first and second passages, said valve having open and closed positions, the open position of said valve permitting the discharge of fluid from said coupling through said first passage while closing communication between said secondary conduit means and said first passage, said valve in a closed position connecting said secondary conduit means and said coupling through said first passage while preventing the discharge of fluid from said coupling through said first passage, said valve being actuated to a closed position by fluid pressure in said secondary conduit means, and means for opening said valve.

6. In subcombination, a flow communicating mechanism comprising, a housing, said housing having a plurality of ports, a first fluid conduit connected to one of said ports and containing a fluid under pressure, a second fluid conduit connected to a second port and containing a second fluid under pressure, and means connecting said conduits, said means comprising a valve slidably mounted within said housing, said valve being movable in one direction by the fluid pressure in one of said conduits, means in said housing for stopping the movement of said valve in said one direction, said valve at one end thereof being provided with chamfered edges, said valve when stopped by said stop means positioning said chamfered edges of said valve adjacent said second conduit permitting communication between the fluids in said first and second conduits.

7. In subcombination, a flow communicating mechanism comprising, a housing, said housing having a plurality of inlet and outlet ports, a first fluid conduit connected to one of said inlet ports and containing a fluid under pressure, a second fluid conduit connected to a second inlet port and containing a second fluid under pressure, and means controlling the communication of fluid between said second inlet and one of said outlet ports, said means comprising a valve slidable within said housing, said valve having open and closed positions, said open position permitting the communication of fluid between said second inlet and said latter-named outlet, said valve being movable to said closed position by the fluid pressure in said first conduit acting on one end of said valve, means in said housing for stopping the closing movement of said valve, said valve being provided at said one end with chamfered edges, said valve when stopped by said stop means being positioned with said chamfered edges opposite said second conduit, said chamfered edges providing communication of the fluid in said first and second conduits with said valve in its closed position.

8. In a fluid coupling having pump and turbine members, a rotatable casing secured to said pump member and extending laterally therefrom for enclosing said turbine member, a source of fluid under pressure, conduit means connecting said source and said coupling for filling the same, said coupling having a fluid discharge port therein, a valve within said casing laterally offset from said discharge port and slidably mounted for movement in a radial direction, portions of said laterally extending casing and said turbine member defining a laterally extending conduit means connecting said discharge port and said valve, said valve having open and closed positions controlling the discharge of fluid from said coupling through said last mentioned conduit means, secondary conduit means connecting said source and one end of said valve for actuation of said valve by fluid pressure to a closed position preventing discharge of said coupling-fill fluid, and spring means biasing said valve to an open position, said valve having a mass subject to the effect of centrifugal force thereon upon rotation of said pump member creating a force acting in a valve opening direction to aid said spring means.

References Cited in the file of this patent

UNITED STATES PATENTS

| | | |
|---|---|---|
| 2,224,884 | Schneider et al. | Dec. 17, 1940 |
| 2,256,878 | Black | Sept. 23, 1941 |
| 2,298,105 | Canaan | Oct. 6, 1942 |
| 2,325,090 | Alison | July 27, 1943 |
| 2,423,812 | Karl et al. | July 8, 1947 |
| 2,557,894 | Siesel | June 19, 1951 |
| 2,723,530 | O'Leary | Nov. 15, 1955 |